INVENTOR
Toni Wüst
BY
Richards & Geier
ATTORNEYS

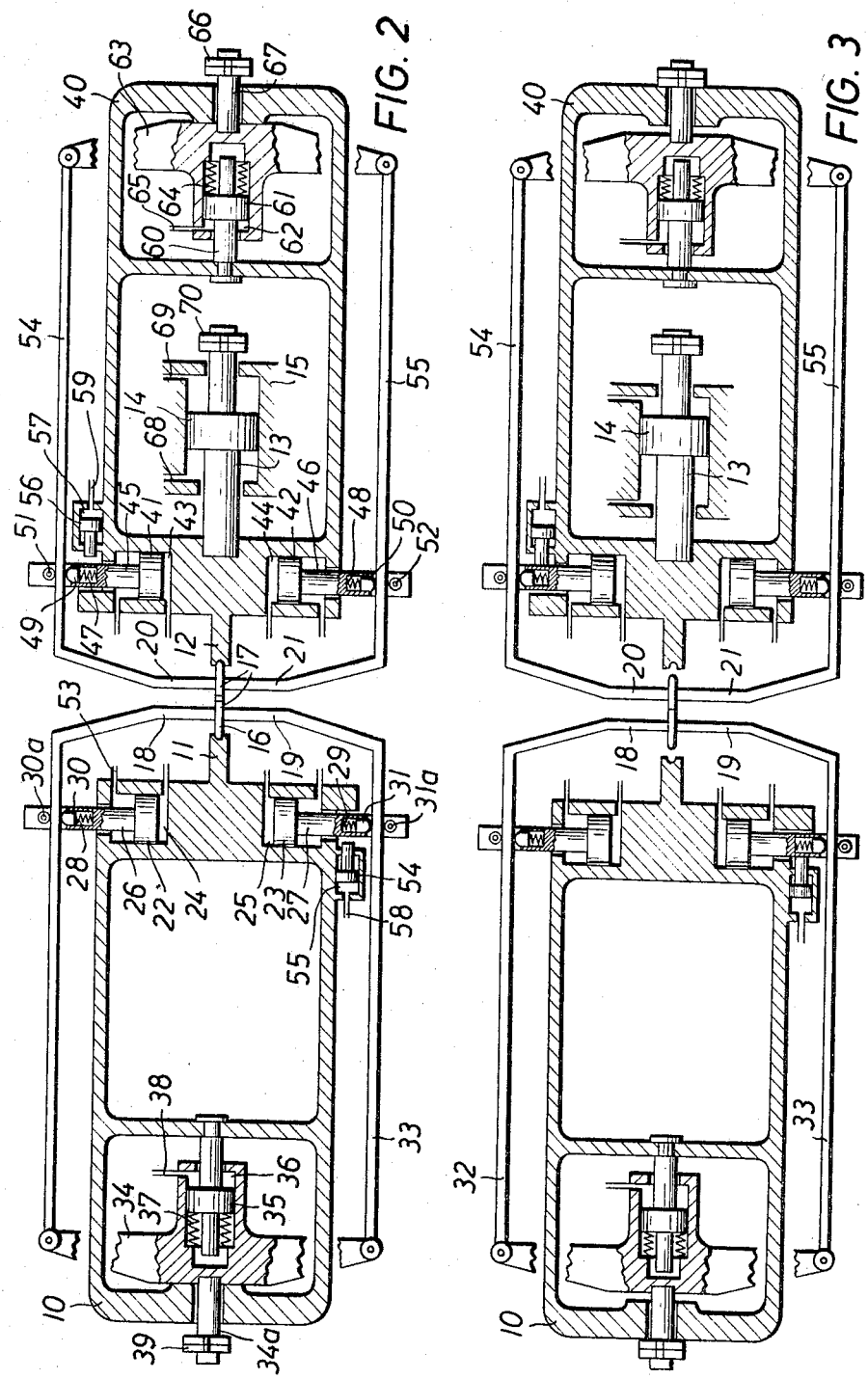

United States Patent Office 3,513,280
Patented May 19, 1970

3,513,280
**PROCESS AND APPARATUS FOR WELDING
C-SHAPED WORKPIECES**
Toni Wüst, Cologne-Bickendorf, Germany, assignor to
Meyer, Roth & Pastor, Cologne-Raderberg, Germany,
a firm of Germany
Filed Aug. 11, 1967, Ser. No. 659,967
Int. Cl. B21l 3/00
U.S. Cl. 219—52                                      9 Claims

ABSTRACT OF THE DISCLOSURE

A C-shaped workpiece, such as a chain link is welded by using clinching steels for centering the workpiece, then withdrawing the steels while connecting electrodes to the ends of the workpiece and supplying current thereto and finally clinching the workpiece by the clinching steels. The apparatus for carrying out the welding preferably includes a clinching steel fixed to the casing and another clinching steel carried by a frame movable by a pressure medium. Each pair of electrodes is joined by a yoke actuated by the pressure medium. Spring-actuating clamping means are used to provide a connection of the electrodes to the workpiece.

---

This invention relates to an apparatus and a process for electrically welding C-shaped workpieces, such as chain links, rings and the like. The invention refers to the resistance-buttwelding process as well as to the singe welding process.

Prior art machines operate by supporting a C-shaped workpiece in an upright position upon the saddle of a welding machine by two clinching steels which engage from the outside the curves of the workpiece and which center and hold it. Then electrodes are mounted upon the ends of the workpiece close to the slit to be welded transversely to the direction of the workpiece.

Hereinafter the C-shaped workpiece is described solely by way of example as being a bent C-shaped chain link.

In the course of the resistance butt-welding process the ends of the link are moved toward each other by pressure exerted upon the steels until the ends touch each other; then a high temperature is produced there by electrical voltage. After this high temperature is reached, the steels are further moved toward each other, the slit is closed and a welded seam is formed which is subsequently cleaned off. The electrical current is switched off, the electrodes are removed and the steels are withdrawn after the link has sufficiently cooled. The cleaning of the seam takes place while the steels hold the link under tension, often while the seam is still warm.

During the singe-welding process the electrodes are mounted in the same manner upon the ends of the link, the steels are moved forwardly until the ends of the link touch each other and the welding current is switched on. Then a reversal takes place, namely, the link ends are moved several times toward and away from each other while under voltage, until a localized strong heating is produced and the material sprays.

This process is more complicated and more expensive than the resistance butt-welding process and results in less welding output per time unit. However, it has the advantage that all detrimental parts, such as oxdized sections slag enclosures or the like, are removed. After the reversal procedure, the clinching of the link and its further treatment are carried out in the same manner as in the butt-welding process.

It was found that both welding processes have drawbacks which result in a lack of uniformity in the firmness of welding connections of different workpieces, particularly those consisting of materials which are difficult to weld. This lack of uniformity is primarily caused by the fact that when bent C-shaped workpieces are being welded, a part of the electrical current, which is more or less strong, flows through the back of the workpiece and heats it. The extent of the heating depends not only upon the length of the link and the cross section of the wire, but also upon the type and the shape of the saddle and of the steels through which heat is removed. The amount of heat removal and thus the extent of the heating of the back of the link are also influenced by different amounts of dirt in, and oxydation of, this machine part. A nonuniform position of the workpiece upon the saddle and in the steels also has a detrimental effect, since an angularly extending workpiece is subjected to less heat removal than a properly mounted one. The same results are caused by inexactness in measurements between the shapes of the saddle and of the steels on the one hand, and of the wire on the other hand.

When the back of the link is heated, its electrical resistance is changed and consequently, the portion of the current at the contacting link ends to be welded, is changed also. It is therefore desirable to regulate the heating. In the case of singe-welding an extensive heating of the link back is undesirable since it diminishes the resiliency of the link which is used to move apart the ends of the link after they have been brought together during the reversal procedure. When the links have great resiliency and are only slightly heated, the movement of the steels is sufficient to produce the reversal. On the other hand, if the link back has been heated excessively, the resilient forces in the back are diminished and the link ends do not follow any more the separating movement of the steels. In that case external action is necessary to provide a rearward movement so as to separate the ends. The heating of the link is then advantageous since there is no great resistance opposing this rearward movement and the heat-sensitive link need not be set so firmly; thus possible impressions upon the surface of the link are avoided. This is of importance for expensive links.

It is difficult to balance against each other the opposing advantages and disadvantages of link heating, particularly since conditions in case of different links cannot be determined, due to the above-described non-uniform back heating.

A further drawback of prior art welding processes when using prior art apparatus, consists in that, during clinching, the curved portions of a link are further bent so that a link held by its back upon the saddle is slidably and frictionally moved with its curved portions in the steels during the clinching. This has the drawbacks of an undesirable wear of the supporting surfaces of the steels, damage to the outer surface of the link and unnecessary expenditure of energy. A further drawback of this sliding movement reside in that strong friction is produced at the containing surfaces of the electrodes and the link ends when the electrodes are so mounted that they are immovable relatively to the steels in the direction of the link axes, namely, in the direction of the clinching movement; this is most detrimental for the current supply.

It has been suggested already to eliminate this friction by combining the electrodes in the clinching direction with the movement of the steels. This eliminates the sliding but does not eliminate that part of the sliding movement of the link ends at the electrodes which results from the bending at the steels. However, this remaining drawback is unintentionally removed in those cases wherein the play in the transmission parts for the electrode movement in the direction of the link legs is so great that the sliding movement starts at least at that location and then continues jointly. Since this play can change, a further lack of security is present. In any event, play is not permissible for the reversal without providing resilient support for the link back.

An object of the present invention is to eliminate these drawbacks.

Other objects of the present invention will become apparent in the course of the following specification.

In the accomplishment of the objectives of the present invention it was found desirable to center the workpiece by the clinching steels upon the saddle in the manner which was used heretofore, then to rig the electrodes to the link ends and then to actuate them in the case of butt-welding by moving them toward each other for heating or by reversing them for singe-welding, whereby the clinching steels are located in a retracted position at a distance from the link, and finally again moving the steels forwardly to carry out the clinching after they moved across the distance constituting the so-called airing slit.

As already stated, it has been known in prior art to center the link upon the saddle by the clinching steels, but this took place as a single engagement of the link by the steels which continued throughout the entire operation. On the other hand, in accordance with the present invention the centering is not characterized by its effect but is carried out as a separate operational step. After the centering of the link and preferably while the steels are still in the same position, the electrodes are caused to tension the link so that the link is then held securely solely by the electrodes. Thus the saddle serves solely as an additional tool for supplying, centering and removing the workpiece. According to a specific embodiment a special device can be provided for withdrawing the saddle from the rest of the welding process after it has accomplished its centering task, so as to avoid a non-uniform heat withdrawal through the saddle.

After the bracing of the link ends the butt-welding or the reversal welding are carried out solely by electrodes and not by the clinching steels so that within these limitations the link can move absolutely freely.

It is known in prior art, however, to subject the link solely to the influence of the electrodes, but then they have been also given the task of clinching, so that it is necessary to provide correspondingly strong forces for the bracing of the link ends by the electrodes. Since the link ends are warm and soft, there is the danger that their surfaces will be damaged by electrode pressure. In accordance with the present invention this danger is eliminated since, on the one hand, the electrodes must be braced only with that force which is necessary to carry out the heating in a butt-welding process or in the range of reversal strokes in singe-welding; according to the present invention the electrodes do not have the clinching task. Furthermore, the bracing of the link ends between the electrodes is weak, since in the process of the present invention the back heat is considerably higher than that in prior art and, furthermore, is completely uniform. The reason is that when heating is carried out in accordance with the process of the present invention, an airing gap is always present between the curvatures of the link and the steels, so that no heat removal takes place therein; furthermore, there is the above-mentioned possibility of withdrawing the saddle and keeping this heat also in the link. Due to these provisions, the shaping work in the link by the electrodes during the heating is greatly reduced as the result of the increase of link temperature, all possible friction is eliminated and, furthermore, the danger is avoided that the link ends, due to rolling friction in the steels, will extend in the shape of a V toward each other and will not be in alignment, which was possible in prior art processes. Of the greatest importance, however, is the creation of uniform conditions for the links irrespective of the condition of the machine and deviations in link measurements.

As already stated, thereupon the clinching is carried out by the steels in the known manner; however, the steels must pass through the airing gap before they engage the curvatures of the link and carry out the clinching.

According to the above-described embodiment of the present invention the forceful connection of the electrodes with the steels is terminated at the end of the current flow and after they have accomplished their task, so that the clinching is carried out solely by the steels. However, according to another embodiment of the present invention the electrodes can participate in the work of the steels in that they clinch with a force which is greater than the initial clinching resistance. This shaping resistance of the chain can increase until additional clinching force by the steels becomes necessary and then the steels begin to move relatively to the electrodes. Due to this feature, the steel can be made smaller and smaller forces operating upon the chain curvatures can be used. The unavoidable rest of the sliding movements between the link curvatures and the steels is also smaller and starts at a later time period.

Finally, according to a further improved embodiment of the present invention the electrodes move the link ends away from each other prior to the beginning of the welding and while the steels are retracted, opposite to the clinching direction and while supplying current, to such an extent that the current flows solely through the back of the link without an initial heating of the link ends. This makes it possible to heat the back of the link to the desired advantageous temperature before the welding process begins.

The invention will appear more clearly from the following detailed description when taken in connection with the accompanying drawings, showing by way of example, a preferred embodiment of the inventive idea.

In the drawings:

FIG. 2 is a diagrammatic section through an apparatus of the present invention, showing it in the position indicated as 1G in FIG. 1.

FIG. 3 is similar to FIG. 2 but shows the apparatus in the position indicated as 1H in FIG. 1.

Figure 1A:
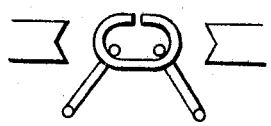
FIG. 1 shows diagrammatically five different positions of the clinching steels and electrodes while carrying out the process of the present invention, indicated as 1A to 1J.

The machine shown in FIGS. 2 and 3 has a casing 10 and a clinching steel 11 which is firmly fixed to the casing. The other clinching steel 12 is connected to the piston rod 13 of a piston 14 so that it can move until stopped by engagement of the nuts 70 connected with the piston. The cylinder 15 containing the piston is shown as being a fixed part of the casing 10.

The C-shaped preliminarily bent chain link 16 is mounted upstanding upon a saddle (not shown). The ends 17 of the link are engaged by two electrodes 18, 19 carried by the steel 11 and by two electrodes 20, 21 carried by the movable steel 12. The tensioning movement of the electrodes 18 and 19 is effected by two pistons 22 and 23 which are movable in cylinders 24 and 25, respectively.

The cylinders 24 and 25 are shown as being parts of the casing 10. The pistons 22 and 23 have piston rods 26 and 27 carrying pressure pieces 30 and 31, respectively, subjected to pressure of springs 28 and 29 and extending in the direction of piston rods 26 and 27. Rods 32 and 33 which carry the electrodes 18 and 19 are slidably engaged between the pressure pieces 30 and 31 and rollers 30a and 31a. The rear ends of the rods 32 and 33 are joined by a yoke 34 the center of which is engaged by a piston 35. A spring 37 engages the piston 35. A cylinder 36 constituting a part of the yoke 34 is provided with an inlet 38. When the inlet 38 does not transmit fluid under pressure to the cylinder 36, the spring 37 presses the yoke 34 against the casing 10. The yoke 34 carries a rod 34a extending through a wall of the casing 10 and carrying counter screws 39. When pressure in cylinder 36 is increased the counter screws 39 carried by the rod 34a are pressed against the casing 10.

A frame 40 is movable along a straight line in the casing 10 and is connected with the piston rod 13 and the movable steel 12. Pistons 41 and 42 are movable in cylinders 43 and 44 which are connected with the frame 40. The pistons 41 and 42 have piston rods 45 and 46 carrying at their outer ends pressure pieces 49 and 50 which are engaged by springs 47 and 48; they also carry rollers 51 and 52.

Four conduits 53 for the pressure medium transmit pressure to the pistons 22, 23, 41 and 42 in such manner that the electrodes are pressed against the ends of the link. In order to fix each side of the pairs of electrodes 18, 19 and 20, 21, the piston rod 27 is clamped by a clamping piston 54 movable in a cylinder 55, while the piston rod 45 is clamped by a clamping piston 56 movable in a cylinder 57 when pressure medium is transmitted through the conduits 58 and 59.

A piston rod 60 is located upon the side of the movable steel 12; it is connected with the frame 40 and the piston 61 and extends in alignment with the steel 12 and the piston rod 13 of the piston 14. The cylinder 62 containing the piston 61 forms a part of a yoke 63. The yoke 63 is subjected to pressure of a spring 64 and lies against the frame 40.

Pressure medium is transmitted to the cylinder 62 through a conduit 65 and causes a movement of the yoke 63 until the counterscrews 66 carried by a rod 67 which is connected to the yoke 63, strikes the frame 40. The yoke 63 carries hinged rods 54 and 55 which are connected to the electrodes 20 and 21, respectively.

The cylinder 15 containing the piston rod 13 of the clinching steel 12, is open on both sides to the pressure medium supplied by conduits 68 and 69.

The operation of the described device is as follows:

After the workpiece has been brought by the saddle, pressure medium is supplied through the conduit 69 to the piston 14 so that the steel 12 is moved. The clinching movement of the steel 12 toward the fixed steel 11 centers the workpiece between these steels. Then the pistons 22, 23, 41 and 42 are subjected to the pressure of a pressure medium through the conduits 53, and thus the link ends 17 are firmly fixed by the electrodes 18, 19, 20 and 21. Conduits 58 and 59 now transmit pressure fluid by means of which the pistons 54 and 56 in the cylinders 55 and 57 are pressed against the piston rods 27 and 45 so as to stop them. Then pressure fluid is transmitted through the conduits 38 and 65 into the cylinders 36 and 62 so as to move them relatively to the pistons 35 and 61 up to the stops 39 and 66. The force of each cylinder 36, 62 is then greater than the force of the cylinder 15, so that on the one hand the yoke 34 is connected with the casing 10 by stops 39 and on the other hand the yoke 63 is connected by stops 66 with the movable frame 40. Thus the steel 12 is moved to the extent of a stroke equal to the sum of movements of the piston 35 in the cylinder 36 and of the piston 61 in the cylinder 62 (FIG. 3). Here and hereinafter the tensioning forces of the electrodes are so chosen that there can be no sliding at the link ends. Thus an air gap is provided between the clinching steels and the rounded portions of the link. If desired, the saddle can be removed. Thereafter for butt-welding, pressure is increased in the conduit 69 and the piston 14 is moved in the cylinder 15 in *one* direction; for singe-welding the reversal is carried out by providing pressure fluid alternately in the conduit 68 as well, so that the piston 14 is moved in *both* directions. When the welding current is switched on, the link ends 17 are then heated or their singeing is provided. In this case also the force of the piston 14 in the cylinder 15 is smaller than one of the two forces of the cylinders 36 or 62.

For the clinching operation, pressure in the conduit 69 is raised to the clinching pressure so that the piston 14 strikes against the cylinder 15 with the stop screws 70. The clinching operation can be carried out solely by the electrodes 18–21, or by the electrodes along with the steels 11, 12, or solely by the steels, depending upon the extent of pressure in the conduits 38 and 65 relatively to the clinching resistance of the link ends 17.

Thereafter the seam can be scraped off and the link replaced.

Figure 1B:
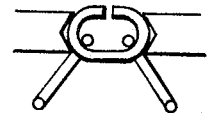
Figure 1C:
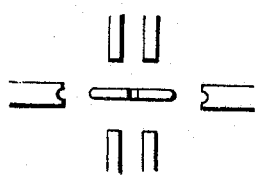
Figure 1D:
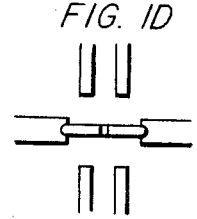
Figure 1E:
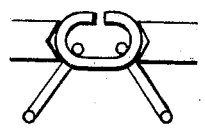
Figure 1F:
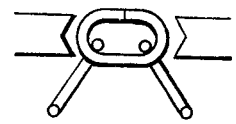
Figure 1G:
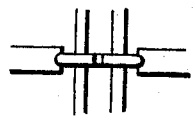
Figure 1H:
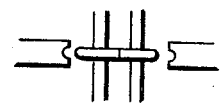
Figure 1I:
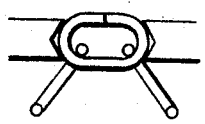
Figure 1J:
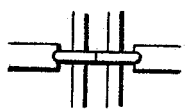

As already stated, the procedure is illustrated diagrammatically in FIG. 1. The first operative position after the placing of the link is indicated as 1A and 1C. The centering of the link is indicated as 1B and 1D. The mounting of the electrodes is indicated as 1E and 1G. The withdrawal of the steels and the formation of the airing gap are indicated as 1F and 1H, while the final clinching operation is indicated as 1I and 1J.

It is apparent that the example described above has been given solely by way of illustration and not by way of limitation and that it is capable of many variations and modifications within the scope of the present invention. All such variations and modifications are to be included within the scope of the present invention.

What is claimed is:

1. The process of electrically welding a C-shaped workpiece, which comprises centering the workpiece by clinching steels, holding the ends of the workpiece by two pairs of electrodes, withdrawing said clinching steels from said workpiece to form an airing gap, supplying a welding current through the electrodes, to heat the workpiece, and moving back the clinching steels to the workpiece to clinch the workpiece when welding heat is reached.

2. The resistance-buttwelding process in accordance with claim 1, wherein said electrodes heat the workpiece ends while bringing them together.

3. The flash-welding process in accordance with claim 1, wherein said electrodes heat the workpiece ends while moving them alternately toward and away from each other.

4. The welding process in accordance with claim 1, wherein the electrodes engage the ends of the workpiece during clinching and follow the clinching movements of said ends.

5. The welding process in accordance with claim 1, wherein the electrodes engage the ends of the workpiece during clinching and exert pressure upon said ends.

6. The welding process in accordance with claim 1, wherein said electrodes heat the workpiece ends while moving them apart prior to the welding opposite the clinching direction and while supplying current, whereby said current flows solely through the back of the workpiece.

7. An apparatus for electrically welding a C-shaped workpiece, comprising two opposed clinching steels, means moving one of said clicnhing steels toward and away from the other clinching steel, the two clinching steels being adapted to engage opposite ends of a workpiece, two pairs of electrodes, said electrodes having ends adapted to engage said opposite ends of the workpiece at right angles to the clinching steels, four elongated rods, each of said rods having an end connected to an opposite end of a separate electrode, two yokes, each of said yokes interconnecting two separate rods connected to a separate pair of said electrodes, separate fluid-actuated means connected with the middle of each yoke for moving the yoke in one direction, separate resilient means connected with the last-mentioned means for moving the yoke in the opposite direction and stops connected with said yokes for limiting the movement of said yokes.

8. An apparatus for electrically welding a C-shaped workpiece, comprising two opposed clinching steels, means moving one of said clinching steels toward and away from the other clinching steel, the two clinching steels being adapted to engage opposite ends of a workpiece, two pairs of electrodes, and four separate locking devices moving the electrodes of each pair toward and away from each other, each of said devices comprising a rod connected with an electrode, a pressure piece engaging said rod, a spring pressing said pressure piece against one side of said rod, a roller engaging the opposite side of said rod, a piston rod carrying said pressure piece, said spring and said roller, a piston connected with said piston rod and a cylinder enclosing said piston, the two pairs of electrodes being adapted to engage said opposite ends of the workpiece at right angles to the clinching steels.

9. An apparatus in accordance with claim 8, further comprising means for clamping two of said piston rods.

References Cited
UNITED STATES PATENTS

| | | | |
|---|---|---|---|
| 2,817,747 | 12/1957 | Devonshire et al. | 219—52 X |
| 3,024,347 | 3/1962 | Esser | 219—52 |

FOREIGN PATENTS

| | | |
|---|---|---|
| 324,569 | 8/1920 | Germany. |
| 688,962 | 3/1953 | Great Britain. |

JOSEPH V. TRUHE, Primary Examiner

W. D. BROOKS, Assistant Examiner